United States Patent
Chen et al.

(10) Patent No.: US 9,696,159 B2
(45) Date of Patent: Jul. 4, 2017

(54) STREETWISE NAVIGATION SYSTEM USING INFRASTRUCTURE ELEMENTS

(71) Applicant: PHILIPS LIGHTING HOLDING B.V., Eindhoven (NL)

(72) Inventors: Hongxin Chen, Shanghai (CN); Engel Johannes Knibbe, Heeze (NL); Xin Ge, Shanghai (CN); Dan Jiang, Briarcliff Manor, NY (US); Yong Qin Zeng, Shanghai (CN); Lei Feng, Shanghai (CN)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 89 days.

(21) Appl. No.: 14/397,952

(22) PCT Filed: Apr. 25, 2013

(86) PCT No.: PCT/IB2013/053264
§ 371 (c)(1),
(2) Date: Oct. 30, 2014

(87) PCT Pub. No.: WO2013/164740
PCT Pub. Date: Nov. 7, 2013

(65) Prior Publication Data
US 2015/0127251 A1  May 7, 2015

Related U.S. Application Data

(60) Provisional application No. 61/641,943, filed on May 3, 2012.

(51) Int. Cl.
*G01C 21/00* (2006.01)
*G01C 21/20* (2006.01)
(Continued)

(52) U.S. Cl.
CPC ........... *G01C 21/00* (2013.01); *G01C 21/206* (2013.01); *G01C 21/3626* (2013.01);
(Continued)

(58) Field of Classification Search
CPC combination set(s) only.
See application file for complete search history.

(56) References Cited

U.S. PATENT DOCUMENTS 5,673,039 A * 9/1997 Pietzsch ............... G08G 1/015
340/332
9,046,380 B2 * 6/2015 Mori .................. G01C 21/3602
(Continued)

FOREIGN PATENT DOCUMENTS

CN    1941028 A    4/2007
CN    101639977 A   2/2010
(Continued)

OTHER PUBLICATIONS

"Synapse Intelligent Light System, Manage Lighting over the Internet for Commercial Buildings", 2010 Synapse Wireless.
(Continued)

*Primary Examiner* — Edward J Pipala

(57) ABSTRACT

A system and method for providing directional information to a user using existing infrastructure elements (150) is disclosed. The method comprising determining a route of infrastructure elements (150) between a current location and a remote location, wherein the current location is associated a first element in the route and the last element in the route being closest to the remote location, wherein each of the elements in the route are identified by at least one of: a physical identification and a data identification, and providing a visual indication, progressively, to each of the infrastructure elements in the route at a predetermined time and for a determined period, wherein the progressive display of
(Continued)

the visual indication provides for direction control information.

17 Claims, 5 Drawing Sheets

(51) Int. Cl.
   *G01C 21/36* (2006.01)
   *G08B 7/06* (2006.01)
   *H05B 33/08* (2006.01)
   *G01S 19/13* (2010.01)

(52) U.S. Cl.
   CPC .............. *G01S 19/13* (2013.01); *G08B 7/066* (2013.01); *H05B 33/086* (2013.01)

(56) References Cited

U.S. PATENT DOCUMENTS

| | | | |
|---|---|---|---|
| 9,237,634 B2 * | 1/2016 | Knibbe | ............ G08B 7/066 |
| 2006/0109113 A1 | 5/2006 | Reyes | |
| 2010/0102960 A1 | 4/2010 | Simon | |
| 2010/0153003 A1 | 6/2010 | Merkel | |
| 2010/0259931 A1 | 10/2010 | Chemel | |
| 2011/0022201 A1 | 1/2011 | Reumerman | |
| 2011/0238299 A1 | 9/2011 | Nguyen | |

FOREIGN PATENT DOCUMENTS

| | | |
|---|---|---|
| CN | 102103798 A | 6/2011 |
| DE | 102009031019 A1 | 12/2010 |
| EP | 2290324 A1 | 3/2011 |
| JP | 2003108052 A | 4/2003 |
| JP | 2005234768 A | 9/2005 |
| JP | 2006233503 A | 9/2006 |
| JP | 2007156651 A | 6/2007 |
| KR | 2007003423 A | 1/2007 |
| NL | 1035392 C1 | 11/2009 |
| WO | 2007090950 A1 | 8/2007 |
| WO | 2009038557 A1 | 3/2009 |
| WO | 2011015975 A2 | 2/2011 |

OTHER PUBLICATIONS

Bhargava, Bharat et al "A Mobile-Cloud Pedestrian Crossing Guide for the Blind", 2011.

* cited by examiner

STREETWISE NAVIGATION SYSTEM USING INFRASTRUCTURE ELEMENTS

CROSS-REFERENCE TO PRIOR APPLICATIONS

This application is the U.S. National Phase application under 35 U.S.C. §371 of International Application No. PCT/IB2013/053264, filed on Apr. 25, 2013, which claims the benefit of U.S. Provisional Patent Application No. 61/641,943, filed on May 3, 2012. These applications are hereby incorporated by reference herein.

This application is related to the field of navigation systems, and more particularly to a system to provide intuitive instructions for directing users to their desired destinations.

Street maps and asking for directions have typically been the means for navigating around city streets. Typically, when a user wants to get to a desired location within a new city, the user purchases a map and begins the task of walking or driving to the desired destination by studying the map details. As the user (e.g., pedestrians, cyclists, and other slow moving users) gets closer to the desired destination, the user may stop to ask questions of persons on the street.

With the merging of the cellular telephone system technology and Global Positioning Satellite (GPS) system technology, a user may now be conveniently directed to a desired location without having to purchase maps or ask strangers for directions. However, the accuracy of the technology may cause the user to continue to ask for directions.

In addition, in case of emergencies, and when officials desire the evacuation of people from one or more areas, the officials may want to provide directional instructions to the people to provide the quickest, safest and most direct instructions to remove the people from the area.

Hence, there is a need for an efficient directional navigation system that may be conveniently used by the users to obtain directions to desired locations and which may be utilized by local officials to provide evacuation directions to persons within an area in which an emergency has occurred.

A system for providing directional information is disclosed, the system comprises a plurality of infrastructure elements arranged in at least one network configuration, the infrastructure elements having at least one of a physical location identification and a data identification, an interface connected to each of the plurality of infrastructure elements, the interface including at least one of: an input means and a visual output means, a central controller in communication with the infrastructure elements, the central controller responsive to a input received from an input device associated with one of said plurality of infrastructure elements regarding a remote location, assigns a visual indicator to the input received, determines a route of selected ones of the plurality of infrastructure elements between a position associated with the input device providing the input received and an infrastructure element close to the remote location, wherein the selected ones of the plurality of infrastructure elements are generally adjacent; and providing the assigned visual indicator progressively to each of the selected ones of said plurality of infrastructure elements in the route at a predetermined time for a determined period.

The advantages, nature, and various additional features of the invention will appear more fully upon consideration of the illustrative embodiments to be described in detail in connection with accompanying drawings wherein like reference numerals are used to identify like element throughout the drawings.

It is to be understood that the figures and descriptions of the present invention described herein have been simplified to illustrate the elements that are relevant for a clear understanding of the present invention, while eliminating, for purposes of clarity many other elements. However, because these elements are well-known in the art, and because they do not facilitate a better understanding of the present invention, a discussion of such element is not provided herein. The disclosure herein is directed to also variations and modifications known to those skilled in the art.

Figure 1:
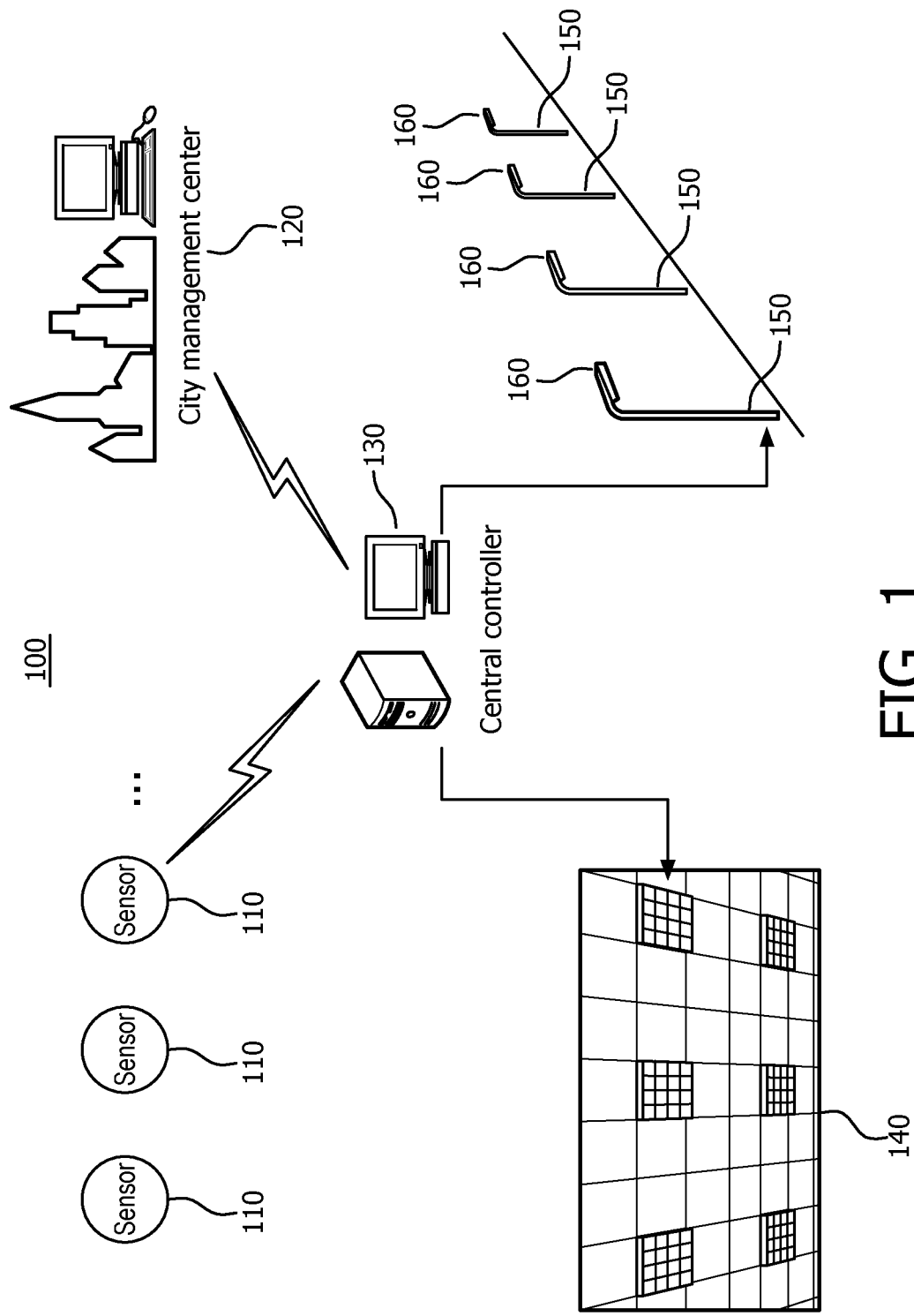
FIG. 1 represents a citywide network in accordance with the principles of the invention.

FIG. 1 represents an exemplary citywide network system 100 comprising at least one central computer 130 (only one being illustrated for purposes of clarity) that is in communication with a plurality of sensor elements 110 and/or lighting elements 140 that are interconnected in a distribution network.

Sensor elements 110, e.g. smoke sensor, air quality sensor, fire sensor, vision sensor, etc., are installed at places to detect various emergencies and to generate a signal that can be sent to central controller 130 for analysis and proper response.

In addition, the at least one central computer 130 may be in communication with a city management system 120 that provides centralized control over a citywide management. Each of the at least one central controller 130 may provide information to the city management center regarding, for example, traffic, weather, accidents, emergencies, etc. The city management center 120 may provide information regarding large emergency information (e.g. earthquake) to the central controller 130. In response, central controller 130 will select one or multiple escape routes and control the multiple ceiling lights or multiple road lights to provide escape and evacuation information, as will be described more fully herein.

The central controller 130 may also be in communication with a plurality of street lamps 150 or other similar infrastructure items (e.g., telephone poles) within a local region. The street lamps 150 may be arranged in a power distribution network that provides power to each of the street lamps 150. Each street lamp 150 may be identified by an identification that corresponds to its position within the distribution network or may be identified by a physical location. The central controller 130 may provide the city management center 120 with information that may be used to control the local street lamps 150 through a corresponding central controller 130.

Alternatively, the city management center 120 may provide information to the central controllers 130 to monitor the status of the illumination lights 160 on the local street lamps 150.

In accordance with the principles of the invention, the local street lamps 150 (and associated illumination lights 160) and indoor lamps 140 may be used to provide directional information to users. As shown in FIG. 1, the street lamps 150 (or other similar infrastructure), that line the sidewalks of a city's provide a convenient and simple method for providing directions to a user.

In one exemplary embodiment of the invention, the central controller (computer) 130 may receive information from the sensors 110 and/or city management center 120 and may send messages to indoor lighting 140 and/or illumination lights 160 included on corresponding street lamps 150. Sensors 110 are used to directly detect emergency incidents (e.g., fire). City management center 120 can also directly send some emergency or potential emergency information (e.g., a disaster or an expected disaster) to the central controller 130. The central control 130 may then react to the received information and control the lighting 160 on street lamps 150 to provide orderly direction movement. For example, the central control 130 may control the indoor lighting system 140 and/or the outdoor lights 160 on the street lamp 150 to provide directional control to those in the local area to evacuate the area.

Figure 2:
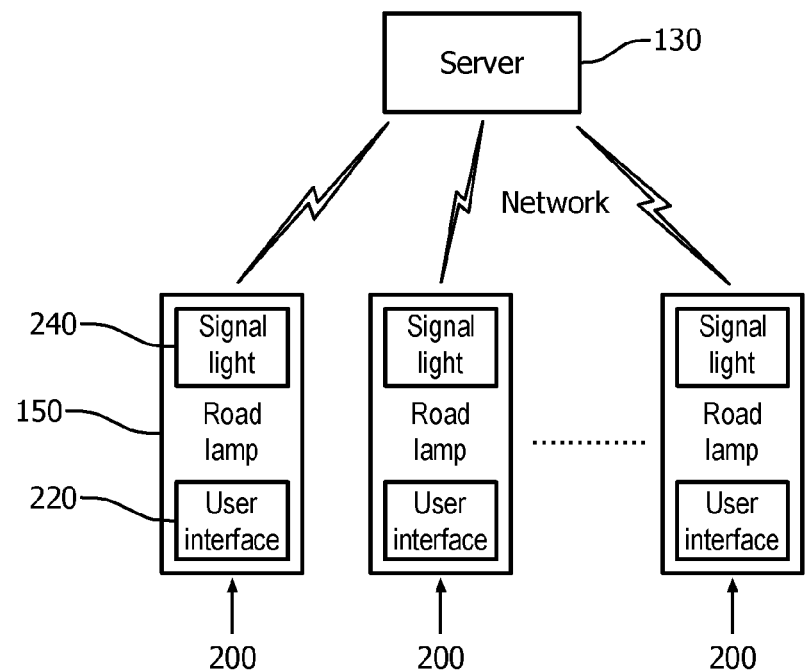
FIG. 2 represents a network configuration in accordance with the principles of the invention.

FIG. 2 illustrates an exemplary configuration of a central computer (i.e., server) 130 in communication with each of a plurality of streetlamps (or lampposts) 150, each street lamp 150 including an interface 200, a user interface 220 and at least one signal light 240. The signal light 240 may represent a light that is used to control traffic at an intersection, for example. Alternately, the signal light 240 may represent a post identification (e.g., physical location, data network identification, etc.). The interface 200, the user interface 220, signal light 240 and lights 160 on street lamps 150 may be powered from the electrical power supplied to the street lamp 150 in a conventional power network. Alternatively, the interface 200 may be powered by solar cells (not shown) that are attached to a corresponding streetlamp 150. In addition, the server (central controller computer) 130 may be in wired or wireless communication with each of the plurality of streetlamps 150 over the network. Wireless protocols, such as IEEE 802.11a/b/g/n (and other similar IEEE wireless standards) are well-known in the art and need not be discussed in detail herein. In addition, data signals may be provided between the central controller 130 and each streetlamp 150 over existing power line wired networks. Data over Power line networks are also known in the art and need not be discussed in detail herein.

Each streetlamp 150 may be designated with a unique physical address that the central controller 130 may use to identify the streetlamp and the associated interface and with a data network identification that may be used to address or provide communication to the interface 200 and/or controllers within the streetlamp that control the operation of any illumination device attached to the street lamp 150.

Figure 3:
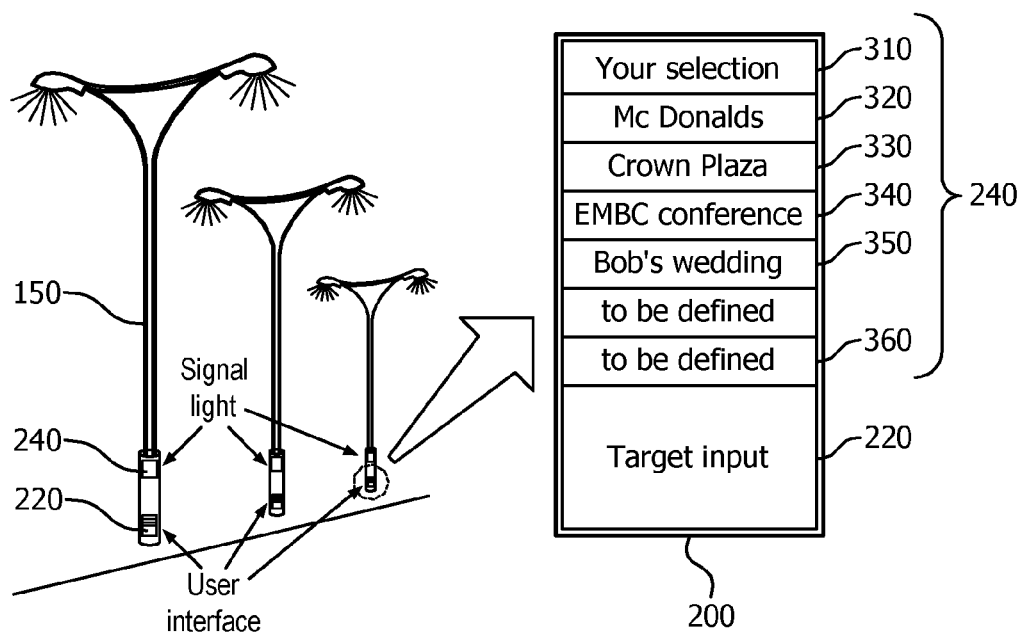
FIG. 3 represents an exemplary interface in accordance with the principles of the invention.

FIG. 3 illustrates an exemplary interface 200 incorporated onto streetlamp 150 that provide information to a user. The interface may include a plurality of areas 240, which are individually designated as 310 . . . 350, herein, that are may be color coded that may be used to provide information (e.g., directions) to a user. Spare areas 360 may be included for future expansion. The color coding provides easy visual route identification, as the color progressively is displayed from one streetlamp 150 to a next streetlamp 150.

The interface 200 may also include a user interface area 220 that allows a user to input information, e.g., a desired destination. The user interface area may include one or more of well-known man-machine interfaces. For example, although not shown, it would be recognized that the input user interface area 220 may include a keyboard to enter alphanumeric character or may include a pen type input to enter alphanumeric information or may include a voice recognition system that allows the user to input spoken words. Other similar type input device may be incorporated into the input area 220 to allow a user to input desired information. In addition, the interface 200 may include an audio output generator (not shown) that may provide audio output in response to the user's input (e.g., your destination is 3.2 miles west of this location) or may provide a large volume output in case of emergency (e.g., "emergency declared please follow light for evacuation").

In response to the inputted desired destination, the central controller 130 determine routes of streetlamps 150 from the inputted location to the destination location, wherein the first streetlamp 150 in the route is associated with a current location and the last streetlamp 150 in the route is the streetlamp 150 closest to the destination. The route associated with the destination location is chosen so that adjacent streetlamps 150 may be used to provide directional information from the current location to the streetlamp 150 closest to the destination. If the desired destination is outside the local area, then the central controller 130 may determine the last streetlamp 150 to be in a next area and handoff the user to a next central controller.

In one aspect of the invention, a directional control color may be selected that the user then follows from street lamp 150 to street lamp 150 until the user arrives at the desired destination. In another aspect, the control color may be implemented on alternating street lamps in order to provide for more users into the system. In one aspect of the invention, the directional colors may only be presented on two or three adjacent streetlamps and as the user follows the directional colors, the directional colors will progressively light on a next one or two streetlamps 150 as the user approaches the streetlamp showing the directional color. In one aspect, a predetermined walking speed may be considered in determining a time when to light the directional colors on a next one or two streetlamps. In one aspect of the invention, the user may be required to contact the light in order to acknowledge that the user is following the lighting system.

In the illustrated example, having at least five colored displays 310 . . . 350 and two to-be-defined areas 360, allows up-to-seven individual users to be accommodated with the exemplary display. However, the use of the five colored displays is only for purposes of explaining the invention and is not to be considered limited to five elements or the colors shown.

In FIG. 3, one example of the user interface (UI) is shown. In this exemplary aspect of the invention, above the user interface 200 there are signal lights that provide for directional control to predetermined destination locations. In this case, the first light is associated with a user after the user sets his destination successfully. The first light may represent a plurality of lights as shown in FIG. 2. Also shown are designated (predetermined) colors for merchants if the merchants want to advertise. Or the designated areas may be associated with specific events or activities (running events, meetings, etc.) that organizations may organize from time to time. The use of these areas within the interface may be a paid service that provides revenue for the local city to support the network being described. In this case, the user may contact a specific advertising merchant color and be provided directions to the advertising merchant without further input. As previously discussed, many kinds of input method can be utilized, such as write pad or drop down list. In addition, the system can offer user two operation modes, i.e. a selection and a search.

In one aspect of the invention, when a user wants to find a place (i.e., destination, remote location) they may go to the nearest lamppost 150, input or search for their desired destination. The system may then randomly specify a color for their use and show the color on the UI 200. The signal light starts to flash on a next lamppost 150 in sequence with this color for a short duration according to a walking distance to the next lamppost 150. Thus, the user can follow the assigned color as it appears progressively on a next lamppost 150 (assigned in the route) to his destination place. In one aspect of the invention, the interface may include further audio commands to which the user may listen to. In another aspect of the invention, the interface may include an interface to receive communication from a mobile communication device (e.g., Bluetooth, Near Field Communication, cellular communication) and/or provide communication protocols that allow the directions to be transferred to the user's mobile phone or mobile communication device. For example, the interface may include an identification to which a user may "pair" their mobile device to the interface and provide an input through the mobile device. The destination instructions (or other information) may then be provided to the mobile device through the interface in addition to progressively lighting the directional lights, as previously described.

The destination can also be set on the server 130 to enable special application. For instance, the system can enable government, organizations or individuals who are organizing activities to offer navigation to their guests. Thus, the special area on the interface may provide for a single input of a predetermined destination and the system operates to direct the user to the predetermined destination. Also the predetermined location can be associated with merchants to advertise and attract customers to their shops. These kinds of service may require that they be set on the server using administrator privilege. The service can be a paid service to which the merchants pay for the privilege of having a predetermined input location.

As described with regard to randomly selected entered destinations by the user, the system may include pre-determined destinations that the user need only select the pre-determined destination to provide sufficient information to establish a route between the current lamppost 150 and the lamppost 150 closest to the included pre-determined destination. This aspect provides a further convenience to the user in that the user need not have to enter all the necessary information but only provide a single input.

As previously described, the input inputted by the user (which represents the destination location) from the specific lamppost 150 having a physical location identification and a data network identification is then used by the central controller 130 to determine a route to the desired destination. The route includes those lampposts 150 among a plurality of lampposts 150 within the control of the central controller 130 that may be used to direct the user from a current lamppost 150 to a next lamppost 150. As previously discussed, the user is assigned a color (visual indicator) that the user then progressively follows from the current lamppost 150 to a next lamppost 150. In one aspect the central controller 130 may determine the total route of lampposts 150 and may then provide communication to a next lamppost 150 at an appropriate time (based on a walking speed). Or the controller may determine a next lamppost 150 as the user approaches a current lamppost 150 and then provides communication to a dynamically determined next lamppost. Thus, the assignment of a next lamppost 150 in a next time interval is made dynamically.

Figure 4:
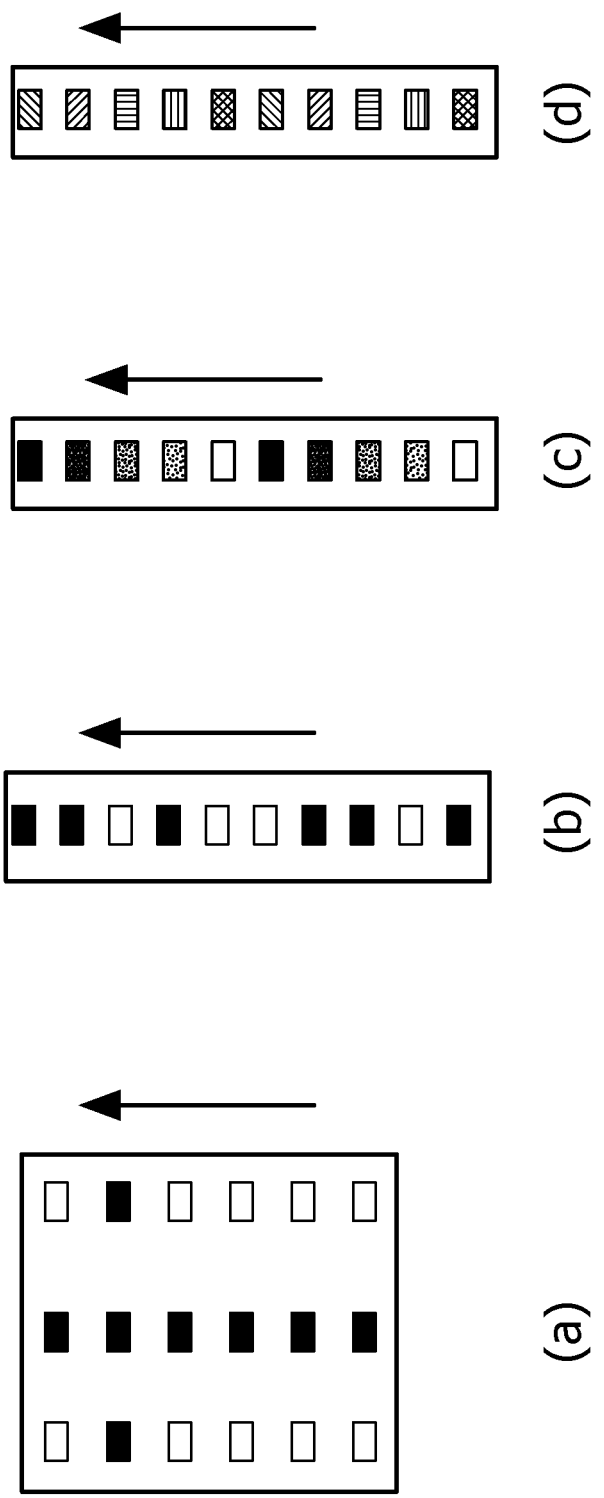
FIG. 4 represents a method of providing direction in accordance with the principles of the invention.

FIG. 4 illustrates exemplary displays, labeled (a), (b), (c) and (d) in which the display on the interface 200 may be progressively advanced in a directional pattern (i.e., in the direction of the arrows) to advise person within the view of the lights to follow in the same direction of travel. This form of progressive display to provide directional information may be valuable in an emergency situation wherein the local officials may direct persons within the emergency area out of the emergency area. In this matter, the city management center 120 may provide to the central controller 130 a remote location outside an area deeming to be in an emergency condition. The central controller 130 may then determine a route from each streetlamp 150 to minimize a walking distance between the current streetlamp 150 and the remote location. The determined direction of travel provides safe evacuation of persons in the emergency area. Thus, the local central computer 130 (or servers) overrides the interface display so that an emergency direction of travel may be displayed on the streetlamps. In addition, the lamps 160 associated with the street lamps 150 may be flashed (turned on/off) at a known rate that provides for visual indication of a direction of travel. Thus, the lamps 160 may be progressively controlled, in turn, so that the turning on/off of the lamps 160 provides the illustration of motion and, hence, a direction of travel to evacuate the area.

Alternatively, FIG. 4 may represent the ceiling lights 140 (see FIG. 1) of an indoor facility. In this case, the lighting control may be used to provide direction to persons within an area to follow the direction of lighting in order escape from the area. For example, in the case of FIG. 4(*a*), three lighting panel bays are allocated to form an arrow to indicate the direction of travel. In FIGS. 4(*b*)/(*c*), the lights within a single lighting panel bay may be flashed at a rate that provides an indication of direction, as previously discussed. In FIG. 4(*d*), if multiple color lights are available, then lights may be flashed at a rate that provides for an indication of direction. As would be recognized, in this case, whether indoor or outdoor lighting is considered, the rate at which the lights are turned-on and -off will repeat so that the lighting does not walk away from the user. For example, as the turning on of lights is progressively advanced to a next light, after a predetermined number of lights have been progressively turned on/off, the pattern is again repeated from the original light. Thus, the lighting will provide the user within an illusion of direction as the lights are progressively advanced and the pattern repeated.

Route discovery can be realized according to the current position and destination position. In one aspect of the invention, a route may be calculated using well-known navigation technique (e.g., GPS) and then the route is correlated to the route with the lighting infrastructure. Thus, while GPS may provide a direct route to the final destination, the central controller 130 translates the provided route to a route that is compensate with the street posts 150 in the local power network. In one aspect, the route could store the location of the lamppost 150 and select a next lamppost 150 on the route based on a predetermined walking direction and walking speed (i.e., estimated geographical position) or by the user acknowledging their presence at the lamppost 150. In this case, the central controller 130 may maintain positions of each lamppost 150 based on their geographical position (e.g. longitude/latitude), their position on a city wide grid, a relative position with respect to fixed locations (e.g., first lamppost 150 in a power line feed circuit), etc. In addition, the lamppost 150 may include a GPS location system that provides geographical position information to the central controller 130. As previously discussed, each lamppost 150 is further identified by a unique address that identifies the lamppost 150 in a data communication network.

Alternatively, the central computer 130 may determine a route based on already pre-determined routing paths that can be realized by directly using the lamp position location information to calculate an optimized route. For example, a destination location may be assigned to a particular streetlamp 150 location and when this destination location is input, a route from the current streetlamp 150 location may be determined.

A general procedure for implementing the streetwise navigation system described herein is as follows:

A base time interval is defined. The base time interval may represent the time that the user is expected to reach the next lamppost 150. For example, the base time interval may be selected based on a predetermined walking speed (e.g., 3 miles/hour). Thus, the time that the next lamppost 150 in the route would receive a signal to begin operating would be at intervals of the determined time (i.e., base time interval). The color light is assigned at the base time interval on a current lamppost for a determined period of time, and then a signal is sent to the next lamppost in a next base time interval.

In addition, while at the lamppost the visual indicator (color) flashes in sequence on the lampposts for a predetermined time. The time that the visual indicator flashes while at the lamppost 150 may also be based on the base time interval or may be overridden by the user when the user contacts the next interface. In addition, the base time interval may be determined based on whether the next lamppost 150 determined to be a next lamppost 150 or every other (second or alternate) lamppost 150 to carry information for the user. Thus, assuming that it is decided that because of system loading, infrastructure spacing, lighting conditions, etc., every other lamppost 150 is allocated to a route, and further assuming that the average walking speed is an determination criterion, the base time interval would be twice as long as the base time interval in the case every lamppost 150 was selected to carry information for the user.

In addition, the determined time that is used at the lamppost 150 to determine flashing rate can be subdivided in case two or more colors meet together on the same lamppost in the same time interval. The colors can light in turn. The subdivision should be limited. Usually the light not at a cross may have lamps in two directions, while that at a cross may have 4 directions;

The light flash repeats after a certain time period (a predetermined time) to allow people always to be able to see a signal near them (for example, the light flashing for each user may occur at rate of 8 times per base interval). The repeat frequency of the light output can be adjusted according to the use condition. For example, the flash rate may be longer when there are many users;

If too many signals meet together, some signals can be delayed for one extra time interval.

Figure 5A:
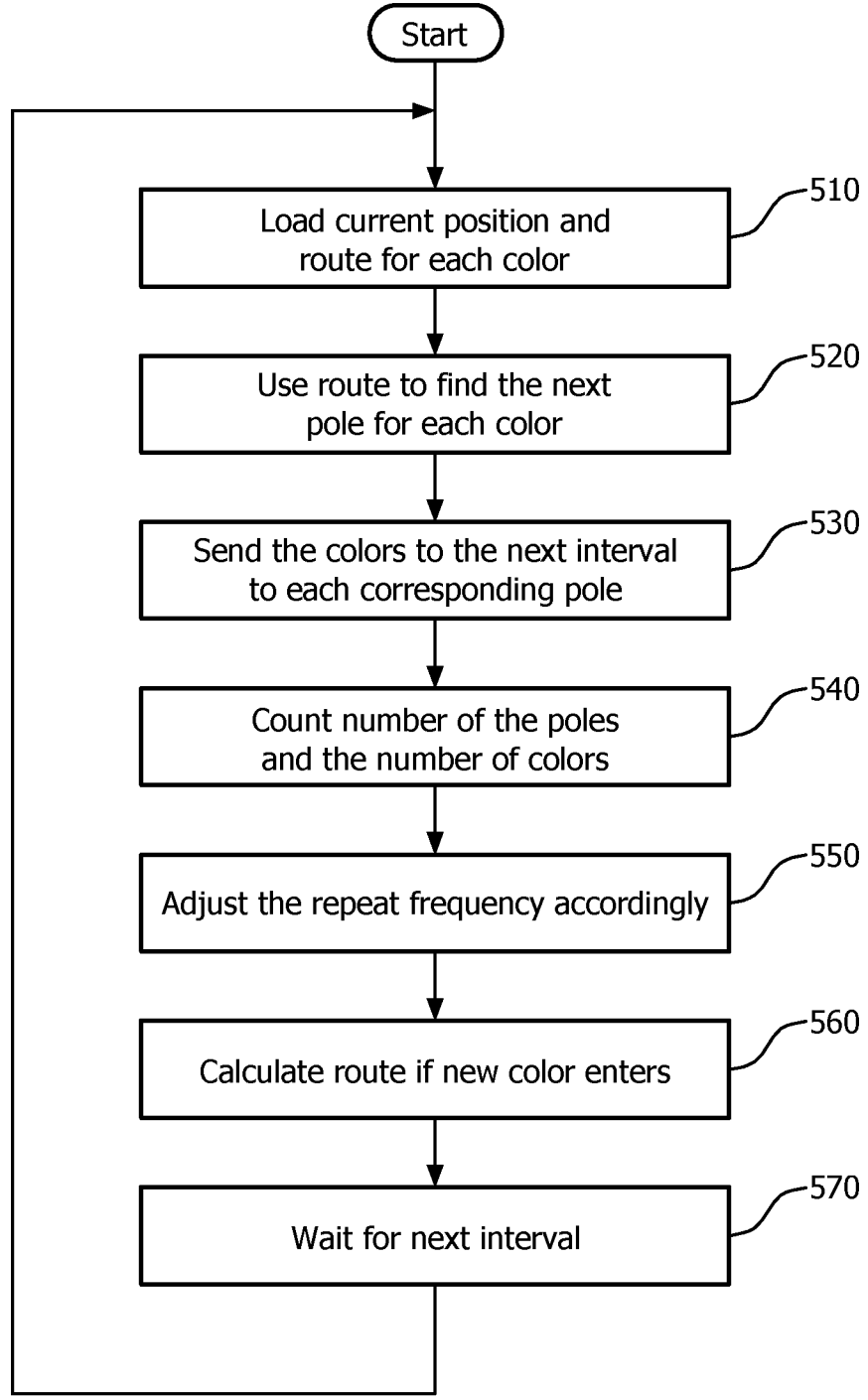
FIG. 5A represents a process flow diagram of a method of operation of the system shown in FIG. 1.

FIG. 5A illustrates an exemplary process operable in the central controller 130 in accordance with the principles of the invention. In this exemplary embodiment, a current position and route is obtained for each color that is to be used, at block 510. That is, in a multiple user system, as has been discussed, the routes for each assigned color are considered and the colors or visual indicators are appropriately provided to streetlamps 150 in the route assigned to that color. At block 520, a next pole or streetlamp 150 within the route assigned by the color is determined or obtained. At block 530, information regarding the color is sent to the next pole in the route associated with the assigned color. At block 540, a determination is made regarding the number of colors being used on a next pole associated with each of the routes to which the next pole is assigned. For example, a next pole in each route may be at a major intersection and a number of different routes converge on this pole at approximately the same time (or within a designated time interval). At block 550, a repeat frequency of the blinking of the assigned color at the pole is adjusted so that each of the colors assigned to the pole are flashed for a predetermined number of times during the period the color is assigned to the pole. At block 560, another route is calculated when a new user enters the system. At block 570, the system waits proceeds to block 510 to continue the process of determining a next pole for each route currently in the system.

Figure 5B:
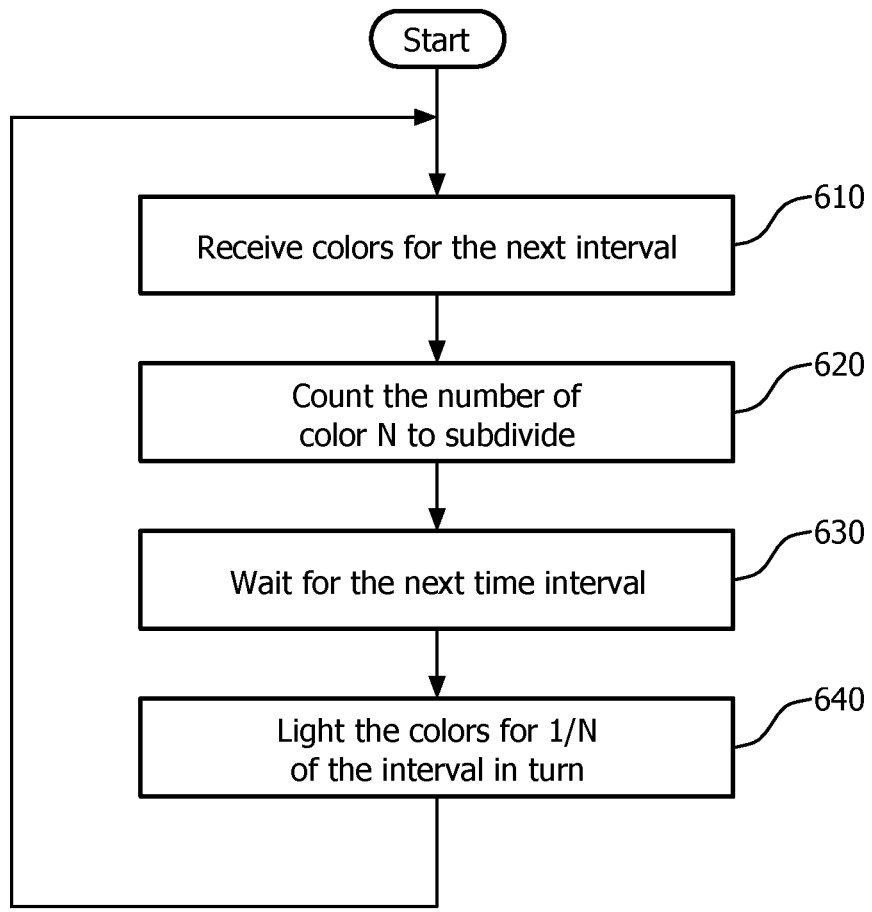
FIG. 5B represents a process flow diagram of processing performed at each pole in the system shown in FIG. 1.

FIG. 5B illustrates an exemplary processing at each next streetlamp 150 within a route of streetlamps 150 in accordance with the principles of the invention. In this exemplary process, information regarding the colors (associated with users) that is to be used is obtained from the central controller 130 at block 610. At block 620, the number of colors obtained then determines a flash rate of each color during a period that the colors for the pole are to be flashed. At block 630, a wait for the next time interval is made and then at block 640 the designated light colors are flashed at a rate based on the number of colors originally provided. Each streetlamp 150 operates their direction lighting system at an appropriate time in accordance with commands provided by the central controller 130.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While there has been shown, described, and pointed out fundamental and novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A system for providing directional information comprising:
   a plurality of infrastructure elements arranged in at least one network configuration, said infrastructure elements having at least one of a physical location identification and a data identification;
   an interface connected to each of the plurality of infrastructure elements, said interface including at least one of: an input device and a visual output device;
   a central controller, in communication with said infrastructure elements, responsive to a input received from an input device associated with one of said plurality of infrastructure elements regarding a remote location,
   assigns a visual indicator to the input received,
   determines a route of selected ones of said plurality of infrastructure elements between a position associated with the input device providing the input received and an infrastructure element close to the remote location, wherein the selected ones of said plurality of infrastructure elements are generally adjacent infrastructure elements; and
   provides the assigned visual indicator progressively to each of the selected ones of said plurality of infrastructure elements in the route at a predetermined time for a predetermined period; and
   wherein the predetermined time is based on a walking speed interval to a next one of said selected infrastructure elements in the route, wherein the walking speed is initially set to a predetermined walking speed and thereafter an average walking speed interval is dynamically determined, based on actual walking speeds of previous walking speed intervals.

2. The system of claim 1, wherein the input device further comprises:
   means for providing at least one predetermined remote location.

3. The system of claim 2, wherein the central controller:
   determines a route to one of said at least one predetermined remote location; and
   causes said lighting element associated with said infrastructure elements to progressively light along said route at a predetermined time for a predetermined period.

4. The system of claim 3, wherein said predetermined time and said predetermined period are selected to provide the illusion of motion.

5. The system of claim 1, wherein each of the infrastructure elements has a physical address.

6. The system of claim 1, wherein each of the infrastructure elements includes a GPS receiver.

7. The system of claim 1, wherein the step of determining the route comprises:
   determining a geographical difference between the positions associated with the input device providing the input received and the remote location;
   determining an infrastructure element closest to said remote location; and
   determining each infrastructure element between the infrastructure element associated with input device providing the input received and the infrastructure element closest to the remote location, wherein each infrastructure element is identified by at least a corresponding physical identification or data identification.

8. The system of claim 1, wherein the input device includes wireless communication protocols.

9. The system of claim 8, wherein the input device is one of: Bluetooth, Near Field Communication, and cellular communication.

10. The system of claim 1, wherein said infrastructure element is at least one of: a streetlamp including a lighting element, a telephone pole including a lighting element, and an indoor lighting system including a plurality of lighting elements.

11. The system of claim 10, wherein the lighting elements are turned on and turned off at a pre-determined rate to provide the visual indicator.

12. The system of claim 11, wherein the lighting elements associated with said infrastructure elements are repeatedly operated.

13. A method for providing directional control comprising: in a controller,
    receiving, a remote location from a current location;
    determining a route from said current location to said remote location, wherein said route is determined from selected ones of a plurality of infrastructure elements arranged in a network of infrastructure elements, said current location being associated with an infrastructure element first in said determined route and a last infrastructure element being associated with an infrastructure element closest to said remote location;
    providing a visual indication, progressively, on each of said selected infrastructure elements, wherein said visual indication is progressively provided on a next infrastructure element in said route at a predetermined time and for a determined period; and
    wherein the predetermined time is based on a walking speed interval to a next one of said selected infrastructure elements in the route, wherein the walking speed is initially set to a predetermined walking speed and thereafter an average walking speed interval is dynamically determined, based on actual walking speeds of previous walking speed intervals.

14. The method of claim 13, wherein the visual indication is provided by one of: a lamp associated with a corresponding one of the plurality of infrastructure elements, a lighting system, and a display associated with a corresponding one of the plurality of infrastructure elements.

15. The method of claim 13, wherein each of said plurality of infrastructure elements is identified by at least one of: a physical network identification and a data network identification.

16. The method of claim 13, wherein the visual indication is flashed at a current infrastructure element at a known rate.

17. The method of claim 13, wherein the progressive display of said visual indication is selected to provide an illusion of motion of said visual indication.

* * * * *